(12) United States Patent
Arai et al.

(10) Patent No.: US 9,541,193 B2
(45) Date of Patent: Jan. 10, 2017

(54) SHIFT CONTROL SYSTEM

(71) Applicant: HONDA MOTOR CO., LTD., Tokyo (JP)

(72) Inventors: Dai Arai, Wako (JP); Hiroshi Kurata, Wako (JP); Hiromi Suzuki, Wako (JP); Takuma Shiouchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 14/583,097

(22) Filed: Dec. 25, 2014

(65) Prior Publication Data
US 2015/0184745 A1 Jul. 2, 2015

(30) Foreign Application Priority Data
Dec. 27, 2013 (JP) ................. 2013-272695

(51) Int. Cl.
*F16H 59/24* (2006.01)
*F16H 59/40* (2006.01)
*F16H 63/50* (2006.01)
*F16H 61/04* (2006.01)
F16H 61/682 (2006.01)
F16H 59/36 (2006.01)

(52) U.S. Cl.
CPC ........ *F16H 63/502* (2013.01); *F16H 61/0437* (2013.01); *F16H 59/40* (2013.01); *F16H 61/682* (2013.01); *F16H 2059/366* (2013.01); *F16H 2061/0474* (2013.01); *F16H 2061/0477* (2013.01); *Y10T 477/675* (2015.01)

(58) Field of Classification Search
CPC .... F16H 2059/366; F16H 59/24; F16H 59/34; F16H 59/40
See application file for complete search history.

(56) References Cited

U.S. PATENT DOCUMENTS

| | | | |
|---|---|---|---|
| 8,965,648 B1 * | 2/2015 | Murayama | F16D 48/06 701/66 |
| 2007/0240955 A1 * | 10/2007 | Zenno | B60W 10/02 192/3.54 |
| 2007/0240956 A1 * | 10/2007 | Minami | B60W 10/02 192/3.63 |
| 2008/0098837 A1 * | 5/2008 | Hiroi | F16H 61/0437 74/331 |

(Continued)

FOREIGN PATENT DOCUMENTS

JP 05-026065 2/1993

*Primary Examiner* — Justin Holmes
*Assistant Examiner* — Lillian Nguyen
(74) *Attorney, Agent, or Firm* — Mori & Ward, LLP

(57) ABSTRACT

A shift control system includes an engine speed detector, a multistage transmission, a gear position detector, a shifting operation detector, and an output controller. The engine speed detector is configured to detect an engine speed. The gear position detector is configured to detect a transmission gear. The shifting operation detector is configured to detect an operation of a shift operating element. The output controller is configured to restrict output of an engine in a case where an up-shifting operation is detected by the shifting operation detector. The output controller is configured to release output restriction of the engine before the gear position detector detects that switching to a next-stage transmission gear by the up-shifting operation of the shift operating element is completed.

20 Claims, 14 Drawing Sheets

(56) References Cited

U.S. PATENT DOCUMENTS

2009/0178874 A1* 7/2009 Mizutani ............... F02D 31/001
                                                                            180/338
2009/0270224 A1* 10/2009 Minami .................. B62M 7/02
                                                                            477/101

* cited by examiner

96 LOAD IS APPLIED TO DOWEL COLUMN

LOAD IS APPLIED TO DOWEL COLUMN

SHIFT CONTROL SYSTEM

CROSS-REFERENCE TO RELATED APPLICATIONS

The present application claims priority under 35 U. S. C. §119 to Japanese Patent Application No. 2013-272695, filed Dec. 27, 2013. The contents of this application are incorporated herein by reference in their entirety.

BACKGROUND OF THE INVENTION

Field of the Invention

The present invention relates to a shift control system.

Discussion of the Background

A shift control system for a motorcycle which allows shift operations without operating a main clutch has been disclosed, and there is known a technology in which, when an up-shifting operation is performed, fuel supply is stopped (engine output is cut off) only during the control time and thereafter restarted (the output cutoff is finished).

For example, JP-A No. H5-26065 listed below discloses that, by focusing on a load applied to a dog clutch, the load applied to the dog clutch is estimated from the engine speed and gear position, and the control time is set longer as the load is larger, thereby ensuring sufficient control time for clutchless up-shifting.

SUMMARY OF THE INVENTION

According to one aspect of the present invention, a shift control system includes engine speed detecting means, a multistage transmission, gear position detecting means, shifting operation detecting means, and an output control part. The engine speed detecting means detects an engine speed. The multistage transmission switches engagement conditions of a dog clutch by displacing shift forks driven in an axial direction of a shift drum along with turning of the shift drum by an operation of a shift operating element. The dog clutch is constituted by meshing engagement between a driving side dog and a driven side dog of transmission gears respectively mounted to a main shaft and a countershaft. The gear position detecting means detects a transmission gear. The shifting operation detecting means detects an operation of the shift operating element. The output control part restricts output of an engine when an up-shifting operation is detected by the shifting operation detecting means. The output control part releases output restriction of the engine before the gear position detecting means detects that switching to a next-stage transmission gear by the up-shifting operation of the shift operating element is completed.

According to another aspect of the present invention, a shift control system includes an engine speed detector, a multistage transmission, a gear position detector, a shifting operation detector, and an output controller. The engine speed detector is configured to detect an engine speed. The multistage transmission is configured to displace shift forks configured to be driven in an axial direction of a shift drum along with turning of the shift drum by an operation of a shift operating element to switch engagement conditions of a dog clutch. The dog clutch is constituted by meshing engagement between a driving side dog and a driven side dog of transmission gears respectively mounted to a main shaft and a countershaft. The gear position detector is configured to detect a transmission gear. The shifting operation detector is configured to detect the operation of the shift operating element. The output controller is configured to restrict output of an engine in a case where an up-shifting operation is detected by the shifting operation detector. The output controller is configured to release output restriction of the engine before the gear position detector detects that switching to a next-stage transmission gear by the up-shifting operation of the shift operating element is completed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
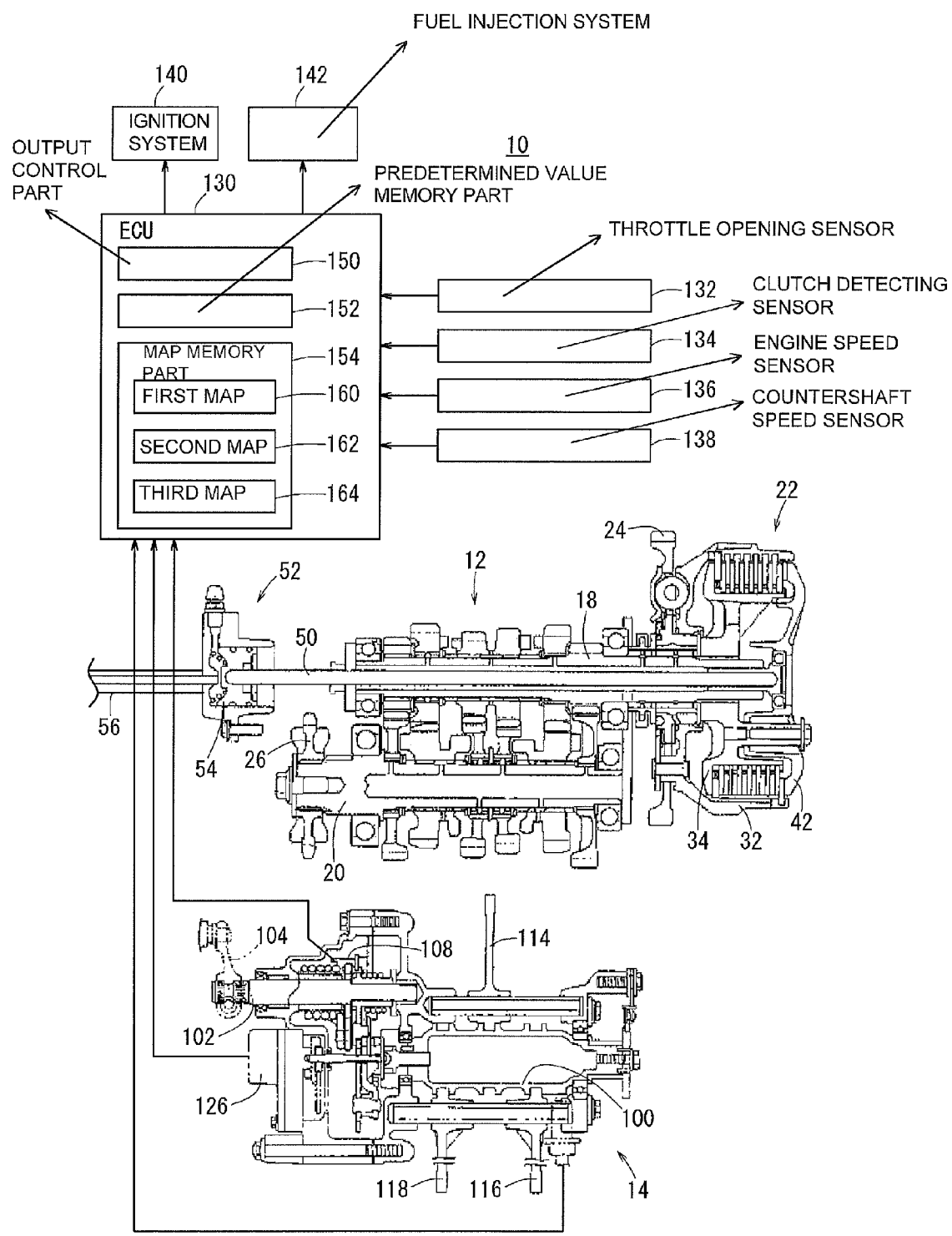
FIG. 1 shows a configuration of a shift control system according to an embodiment.

The embodiments will now be described with reference to the accompanying drawings, wherein like reference numerals designate corresponding or identical elements throughout the various drawings.

Hereinafter, a shift control system according to an embodiment of the present invention will be described in detail with reference to the accompanying drawings.

Figure 2:
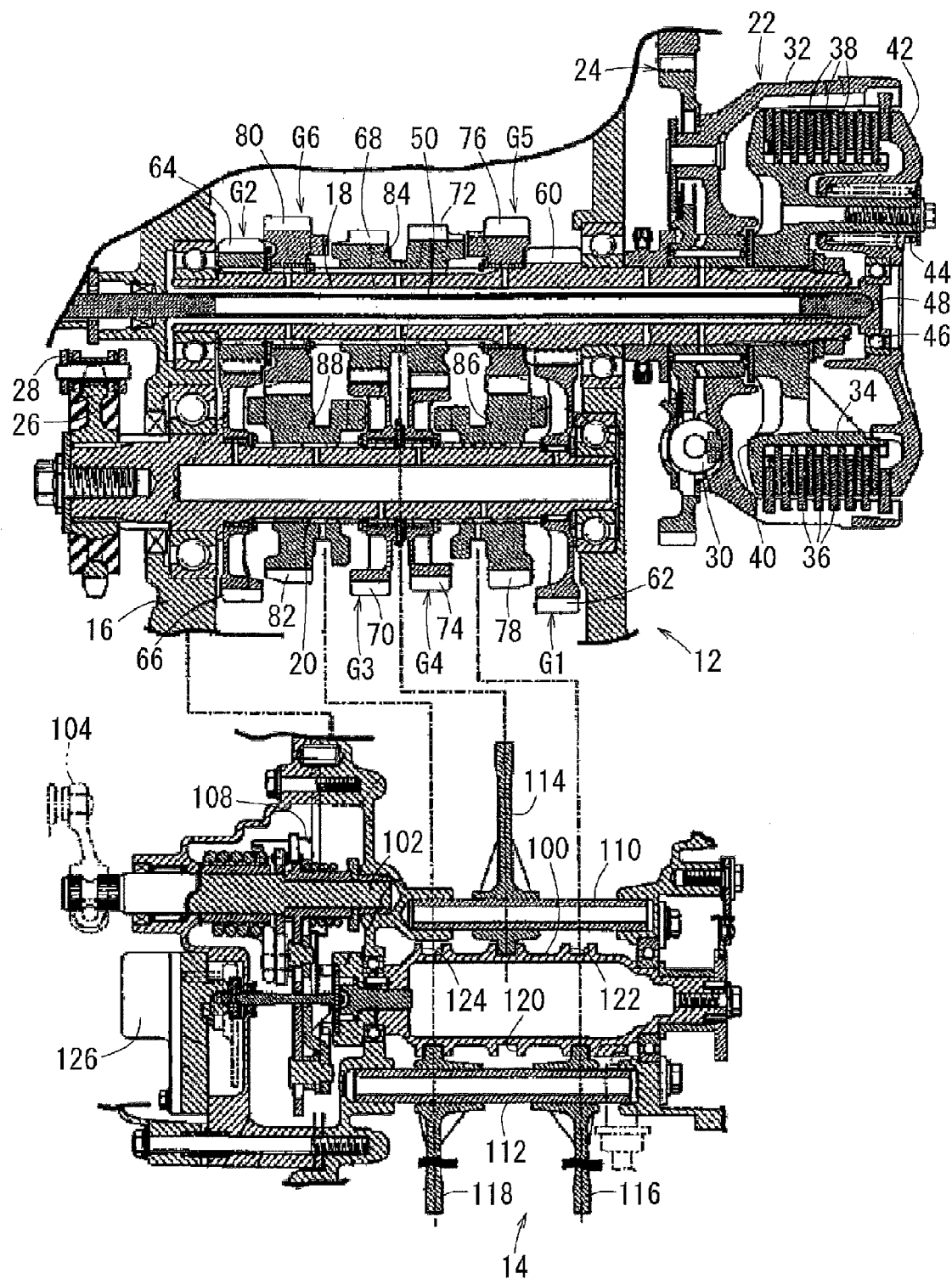
FIG. 2 is a sectional view of each of a transmission and a gear shift mechanism shown in FIG. 1.

FIG. 1 shows the configuration of a shift control system 10 according to this embodiment, and FIG. 2 is a sectional view of each of a transmission 12 and a gear shift mechanism 14 shown in FIG. 1. The transmission (multistage transmission) 12 applied to a motorcycle includes first to sixth transmission gears G (G1 to G6) for transmitting rotational driving power. The transmission gears G are arranged between a main shaft 18 serving as an input shaft and a countershaft 20 serving as an output shaft. The main shaft 18 and the countershaft 20 have axes parallel to each other and are journaled to an engine case 16. The transmission 12 has a generally known construction as a sequential multistage transmission for a motorcycle. The countershaft 20 rotates in synchronization with the rotation of a rear wheel (not shown) serving as a driving wheel.

Between the main shaft 18 of the transmission 12 and a crankshaft (not shown) of an engine, not shown, serving as a power source, there is provided a main clutch 22 for cutting off the transmission of rotational driving power from the engine. The rotational driving power from the engine is transmitted to the main shaft 18 through the main clutch 22 from a primary driven gear 24 that has a meshing engagement with a primary drive gear, not shown, fixed to the crankshaft.

The rotational driving power transmitted to the main shaft 18 is transmitted to the countershaft 20 through the single transmission gear G selected by the gear shift mechanism 14 to be described later. A drive sprocket 26 is fixed to one end of the countershaft 20, and the rotational driving power from the engine is transmitted to the rear wheel through a chain 28 wound around the drive sprocket 26.

The main clutch 22 includes: a clutch outer 32 to which power is transmitted from the crankshaft through the primary driven gear 24 and a torque damper 30; a clutch inner 34 that is disposed at the center in the clutch outer 32 and coupled to the main shaft 18; a plurality of driving friction plates 36 that are axially swingably spline-fitted to an inner peripheral wall of the clutch outer 32; a plurality of driven friction plates 38 that are interleaved with the driving friction plates 36 and axially slidably spline-fitted to the outer periphery of the clutch inner 34; a pressure receiving plate 40 that is integrally provided at an inner end of the clutch inner 34 while abutting on the innermost driving friction plate 36 (on the left-hand side in the drawing); a pressure plate 42 that is configured to press the outermost driving friction plate 36 and slidably mounted to an outer end of the clutch inner 34; and a clutch spring 44 that urges the pressure plate 42 toward the pressure receiving plate 40 (to the left in the drawing).

The driving friction plates 36 and the driven friction plates 38 are held between the pressure plate 42 and the pressure receiving plate 40 by the urging force of the clutch spring 44, so that the main clutch 22 is brought into a connected state to provide the frictional coupling between the clutch outer 32 and the clutch inner 34, thereby allowing the transmission of the rotational driving power from the engine.

A release member 48 with a release bearing 46 interposed between itself and the pressure plate 42 is disposed in a central portion of the clutch inner 34. A push rod 50 axially movably inserted into (penetrating) the main shaft 18 is connected to the release member 48. When the push rod 50 is pressed by force against the spring force of the clutch spring 44 to slide rightward in the drawing, the pressure plate 42 moves in a direction to force the driving friction plates 36 and the driven friction plates 38 away from each other, so that the main clutch 22 moves in a disengagement direction. At this time, by adjusting the pressing force applied to the push rod 50, it is possible to obtain a half-clutch state between the engaged state and the disengaged state. The push rod 50 abuts on an end of a hydraulic piston 54 of a clutch slave cylinder 52 fixed to the engine case 16, and predetermined hydraulic pressure is supplied to an oil passage 56 to thereby cause the hydraulic piston 54 to press the push rod 50 to the right in the drawing. The supply of the predetermined hydraulic pressure to the oil passage 56 is performed by the rider's manipulation (gripping) of a clutch lever, not shown, of the motorcycle.

The first transmission gear G1 is composed of a first-speed driving gear 60 that is integrally formed on the main shaft 18 and a first-speed driven gear 62 that is rotatably mounted relative to the countershaft 20 to mesh with the first-speed driving gear 60. The second transmission gear G2 is composed of a second-speed driving gear 64 that is mounted on the main shaft 18 and a second-speed driven gear 66 that is rotatably mounted relative to the countershaft 20 to mesh with the second-speed driving gear 64. The third transmission gear G3 is composed of a third-speed driving gear 68 that is mounted on the main shaft 18 and a third-speed driven gear 70 that is rotatably mounted relative to the countershaft 20 to mesh with the third-speed driving gear 68.

The fourth transmission gear G4 is composed of a fourth-speed driving gear 72 that is mounted on the main shaft 18 and a fourth-speed driven gear 74 that is rotatably mounted relative to the countershaft 20 to mesh with the fourth-speed driving gear 72. The fifth transmission gear G5 is composed of a fifth-speed driving gear 76 that is rotatably mounted relative to the main shaft 18 and a fifth-speed driven gear 78 that is mounted on the countershaft 20 to mesh with the fifth-speed driving gear 76. The sixth transmission gear G6 is composed of a sixth-speed driving gear 80 that is rotatably mounted relative to the main shaft 18 and a sixth-speed driven gear 82 that is mounted on the countershaft 20 to mesh with the sixth-speed driving gear 80.

Between the fifth-speed driving gear 76 and the sixth-speed driving gear 80, a fifth/sixth speed switching shifter 84 is axially slidably spline-fitted to the main shaft 18. Furthermore, the third-speed driving gear 68 is integrally formed on the fifth/sixth speed switching shifter 84 so as to be opposed to the sixth-speed driving gear 80, and the fourth-speed driving gear 72 is integrally formed on the fifth/sixth speed switching shifter 84 so as to be opposed to the fifth-speed driving gear 76.

Between the first-speed driven gear 62 and the fourth-speed driven gear 74, a first/fourth speed switching shifter 86 formed integral with the fifth-speed driven gear 78 is axially slidably spline-fitted to the countershaft 20. Furthermore, between the second-speed driven gear 66 and the third-speed driven gear 70, a second/third speed switching shifter 88 formed integral with the sixth-speed driven gear 82 is axially slidably spline-fitted to the countershaft 20.

When the fifth/sixth speed switching shifter 84 is axially slid into engagement with the fifth-speed driving gear 76, the fifth-speed driving gear 76 is relatively non-rotatably coupled to the main shaft 18 through the fifth/sixth speed switching shifter 84, so that the transmission gear G5 is selected as the transmission gear G for transmitting rotational driving power. On the other hand, when the fifth/sixth speed switching shifter 84 is axially slid into engagement with the sixth-speed driving gear 80, the sixth-speed driving gear 80 is relatively non-rotatably coupled to the main shaft 18 through the fifth/sixth speed switching shifter 84, so that the transmission gear G6 is selected as the transmission gear G for transmitting rotational driving power.

When the first/fourth speed switching shifter 86 is axially slid into engagement with the first-speed driven gear 62, the first-speed driven gear 62 is relatively non-rotatably coupled to the countershaft 20 through the first/fourth speed switching shifter 86, so that the transmission gear G1 is selected as the transmission gear G for transmitting rotational driving power. On the other hand, when the first/fourth speed switching shifter 86 is axially slid into engagement with the fourth-speed driven gear 74, the fourth-speed driven gear 74 is relatively non-rotatably coupled to the countershaft 20 through the first/fourth speed switching shifter 86, so that the transmission gear G4 is selected as the transmission gear G for transmitting rotational driving power.

When the second/third speed switching shifter 88 is axially slid into engagement with the second-speed driven gear 66, the second-speed driven gear 66 is relatively non-rotatably coupled to the countershaft 20 through the second/third speed switching shifter 88, so that the transmission gear G2 is selected as the transmission gear G for transmitting rotational driving power. On the other hand, when the second/third speed switching shifter 88 is axially slid into engagement with the third-speed driven gear 70, the third-speed driven gear 70 is relatively non-rotatably coupled to the countershaft 20 through the second/third speed switching shifter 88, so that the transmission gear G3 is selected as the transmission gear G for transmitting rotational driving power.

The engagement of the fifth/sixth speed switching shifter 84 with its adjacent fifth-speed driving gear 76 or sixth-speed driving gear 80, the engagement of the first/fourth speed switching shifter 86 with the first-speed driven gear 62 or the fourth-speed driven gear 74, and the engagement of the second/third speed switching shifter 88 with the second-speed driven gear 66 or the third-speed driven gear 70 are performed by dog clutches 90 provided between the above-described shifters and the gears.

Figure 3:
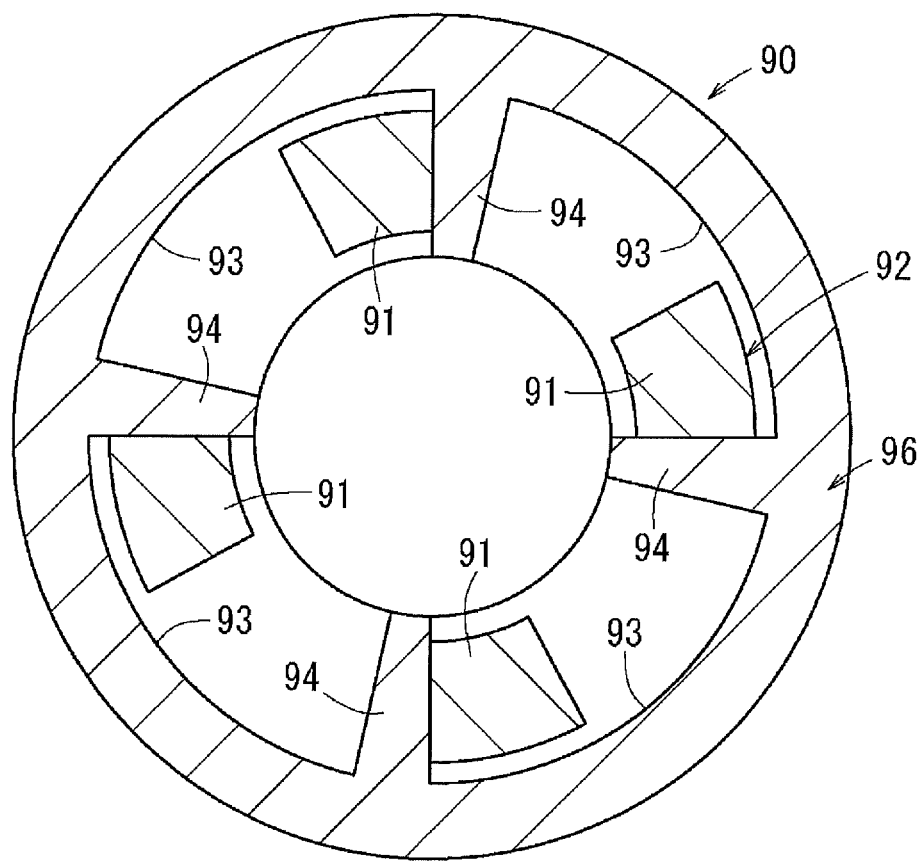
FIG. 3 shows a construction of a dog clutch.

As shown in FIG. 3, each of the dog clutches 90 is composed of: a dog 92 having four dog teeth 91; and a dog 96 having dowel columns 94 forming dog holes 93. If the dog 92 is provided on the shifter, the dog 96 is provided on the gear engaged with the shifter. FIG. 3 shows the dog clutch 90 when viewed in an axial direction of the main shaft 18 or the countershaft 20. The dog clutch 90 is a common mechanism in which the dog teeth 91 and the dowel columns 94 are in mesh in the axial direction, thereby performing the transmission of rotational driving power between coaxially adjacent gears. It should be noted that in this embodiment, the dog 92 serves as a driving side dog that is coupled to the main shaft 18, and the dog 96 serves a driven side dog that is coupled to the countershaft 20 and driven in mesh with the driving side dog 92.

Returning to FIGS. 1 and 2, the gear shift mechanism 14 that selects the single transmission gear G for transmitting the rotational driving power is stored within the engine case 16 in the same manner as the transmission 12. The gear shift mechanism 14 is designed to perform a shift operation by turning a shift drum 100 by the operating force applied when performing the rider's operation (shifting operation) of a shift pedal (shift operating element), not shown, swingably mounted to a vehicle body of the motorcycle. In this embodiment, the shift pedal operated with rider's left foot is coupled to a shift lever 104 fixed to one end of a shift spindle 102. The gear shift mechanism 14 is provided with a spindle rotational angle sensor (shifting operation detecting means) 108 for detecting a rotational angle of the shift spindle 102. With the spindle rotational angle sensor 108, it is possible to detect whether or not a shifting operation is performed.

Three engagement grooves 120, 122, and 124 for engagement with one end sides of, respectively, a first shift fork 114, a second shift fork 116, and a third shift fork 118 are formed in the surface of the hollow cylindrical shift drum 100 having an axis parallel to a first shift fork shaft 110 and a second shift fork shaft 112. The first and second shift fork shafts 110 and 112 have axes parallel to the main shaft 18 and the countershaft 20 and are supported by the engine case 16. The first shift fork 114 is supported in an axially slidable manner on the first shift fork shaft 110, and the second and third shift forks 116 and 118 are supported in an axially slidable manner on the second shift fork shaft 112.

The other end sides of the first to third shift forks 114, 116, and 118 are engaged with the fifth/sixth speed switching shifter 84, the first/fourth speed switching shifter 86, and the second/third speed switching shifter 88, respectively, axially slidably mounted to the main shaft 18 or the countershaft 20.

The engagement grooves 120, 122, and 124 of the shift drum 100 are formed to position the first to third shift forks 114, 116, and 118 on the first and second shift fork shafts 110 and 112 in accordance with the turning position of the shift drum 100. Furthermore, the first to third shift forks 114, 116, and 118 are slid (displaced) to predetermined positions in the axial direction corresponding to each shift position by the turning of the shift drum 100 to switch the engagement conditions of the dog clutch 90 disposed between each shifter and its adjacent gear. Thus, the transmission gear G for transmitting the rotational driving power of the engine is selectively switched, so that shift operation is executed. The turning angle of the shift drum 100 between shift positions is set at 60° so that it turns every 60° angle during shift operation.

The gear shift mechanism 14 is provided with a gear position sensor (gear position detecting means) 126 as rotational angle detecting means that detects a rotational angle of the shift drum 100. That is, because the transmission gear G to be connected is selectively switched depending on the rotational angle of the shift drum 100, the currently selected transmission gear G (gear position) can be detected by detecting the rotational angle of the shift drum 100.

The shift control system 10 further includes: an ECU 130; a throttle opening sensor 132 that detects a degree of opening (throttle opening) of a throttle valve, not shown, of the engine which is turned in response to a throttle operation of a rider; a clutch detecting sensor (clutch detecting means) 134 that detects whether or not the clutch lever (clutch operating element) is operated; an engine speed sensor (engine speed detecting means) 136 that detects a rotational speed (engine speed) Ne of the engine (crankshaft); a countershaft speed sensor (countershaft speed detecting means) 138 that detects a rotational speed Nec of the countershaft 20; and an ignition system 140 and a fuel injection system (injector) 142 provided on the engine. When the clutch lever is operated, the main clutch 22 is disengaged. Because there is a one-to-one relationship between the rotational speed Nec of the countershaft 20 and the rotational speed of the rear wheel, the countershaft speed sensor 138 may be provided on the rear wheel. In this case, the countershaft speed sensor 138 detects the rotational speed Nec of the countershaft 20 by detecting the rotational speed of the rear wheel.

The ECU 130 controls the engine by controlling the drive of the ignition system 140 and the fuel injection system 142 on the basis of detection signals from the throttle opening sensor 132, the clutch detecting sensor 134, the engine speed sensor 136, the countershaft speed sensor 138, the spindle rotational angle sensor 108, and the gear position sensor 126.

The shift control system 10 according to this embodiment is configured to control the output of the engine so that a shift operation can be performed without disengaging the main clutch 22. The ECU 130 includes an output control part 150, a predetermined value memory part 152, and a map memory part 154. The map memory part 154 stores a first map 160, a second map 162, and a third map 164.

The output control part 150 is configured to control the output of the engine, and controls the output of the engine generally on the basis of the throttle opening calculated by the throttle opening sensor 132, the engine speed Ne detected by the engine speed sensor 136, etc. That is, the output control part 150 controls the quantity and timing of fuel injection by the fuel injection system 142 and the ignition timing by the ignition system 140.

When an up-shifting operation is performed using the shift pedal without disengaging the main clutch 22 (without operating the clutch lever), the output control part 150 restricts the output of the engine so as to allow switching (shift operation) between the transmission gears G. Examples of the method for restricting the output of the engine include a method by which the fuel injection timing is delayed or the number of cylinders of the engine to be driven is reduced in order to reduce the output of the engine, or a method by which the ignition by the ignition system 140 or the fuel injection by the fuel injection system 142 is inhibited in order to cut off (zero) the output of the engine. In this embodiment, as the output restriction method, the fuel injection by the fuel injection system 142 is inhibited (cut off) to cut off the output of the engine.

Then when switching between the transmission gears G is performed, the output control part 150 releases the output restriction of the engine to restitute (restart) the output control of the engine. In this embodiment, because the output restriction is performed by inhibiting the fuel injection, its release is performed by restarting the fuel injection. Furthermore, the up-shifting operation refers to the operation for shifting the transmission gear G selected by the transmission 12 to one speed higher position. Therefore, if the currently selected transmission gear G is, for example, the second transmission gear G2, it is switched to the third transmission gear G3 by an up-shifting operation.

Figure 4:
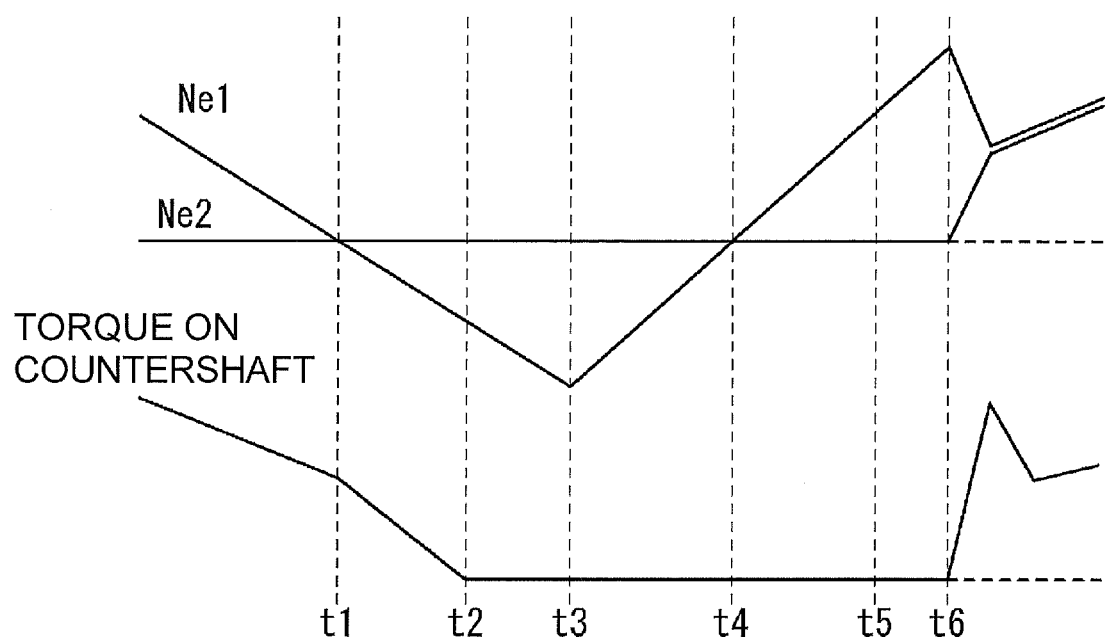
FIG. 4 is a time chart showing rotational speeds of a driving side dog and a driven side dog of the dog clutch engaged by an up-shifting operation when a clutch lever is not operated, and a torque on a countershaft.

FIG. 4 is a time chart showing a rotational speed (hereinafter referred to as the driving side rotational speed) Ne1 of the driving side dog 92 and a rotational speed (hereinafter referred to as the driven side rotational speed) Ne2 of the driven side dog 96 of the dog clutch 90 engaged by an up-shifting operation when the clutch lever is not operated, and a torque on the countershaft 20 (torque applied to the countershaft 20) according to this embodiment. It should be noted that the driving side rotational speed Ne1 of the driving side dog 92 is proportional to the engine speed Ne, and more specifically refers to the rotational speed uniformly defined by the engine speed Ne and the gear ratio between the crankshaft of the engine and the driving side dog 92. It should be also noted that the driven side rotational speed Ne2 of the driven side dog 96 is proportional to the rotational speed Nec of the countershaft 20, and more specifically refers to the rotational speed uniformly defined by the rotational speed Nec of the countershaft 20 and the gear ratio between the countershaft 20 and the driven side dog 96. The driving side rotational speed Ne1 of the driving side dog 92 and the driven side rotational speed Ne2 of the driven side dog 96 are calculated (detected) by the output control part 150 on the basis of the engine speed Ne detected by the engine speed sensor 136 and the rotational speed Nec of the countershaft 20 detected by the countershaft speed sensor 138, respectively.

Figure 5A:
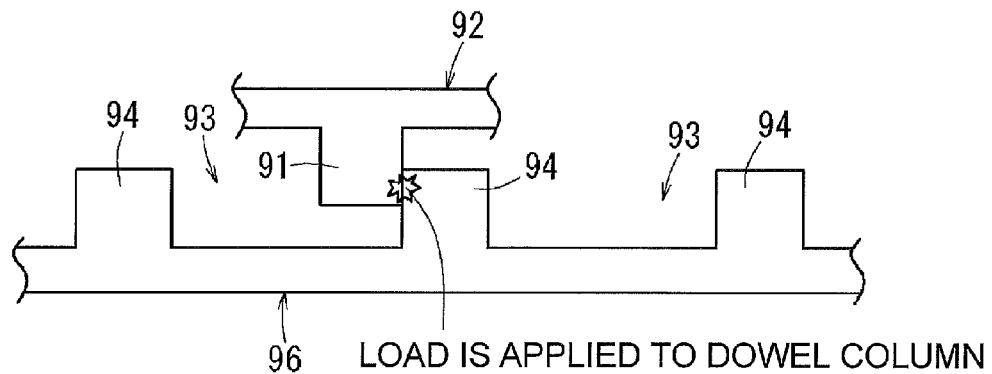
FIG. 5A shows the state of the dog clutch for the next-stage transmission gear which is engaged by an up-shifting operation at timing t1 in FIG. 4.
Figure 5B:
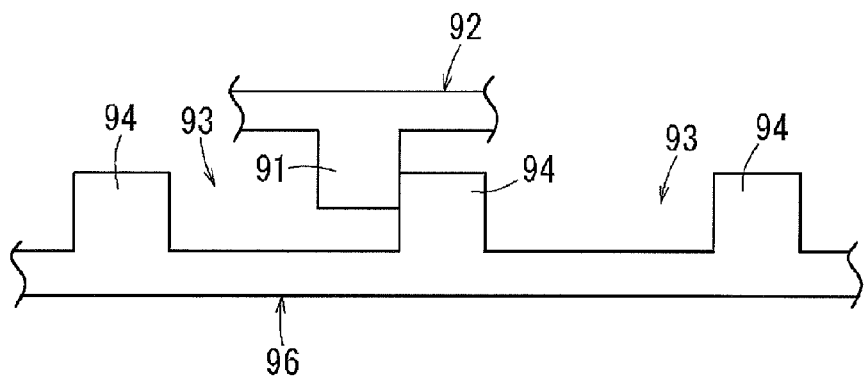
FIG. 5B shows the state of the dog clutch for the next-stage transmission gear which is engaged by an up-shifting operation at timing t2 in FIG. 4.
Figure 5C:
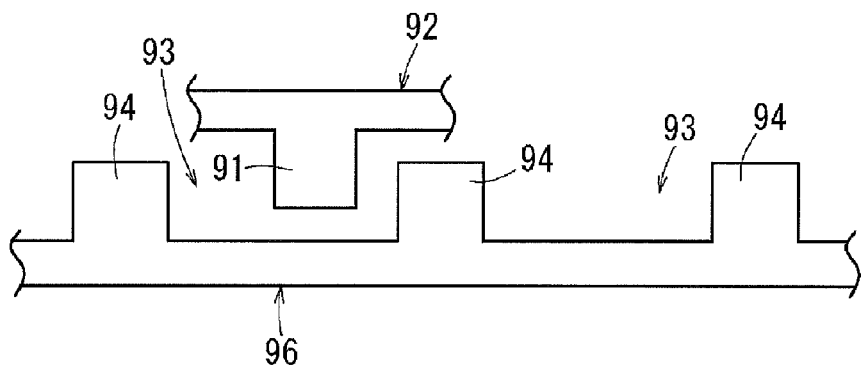
FIG. 5C shows the state of the dog clutch for the next-stage transmission gear which is engaged by an up-shifting operation at timing t3 in FIG. 4.
Figure 6A:
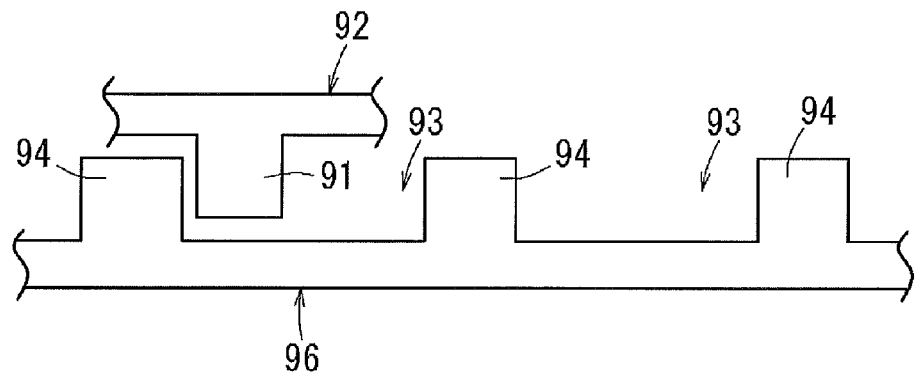
FIG. 6A shows the state of the dog clutch for the next-stage transmission gear which is engaged by an up-shifting operation at timing t4 in FIG. 4.
Figure 6B:
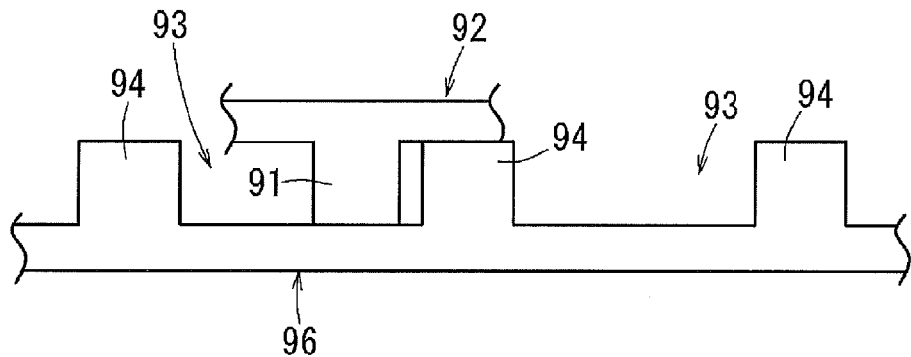
FIG. 6B shows the state of the dog clutch for the next-stage transmission gear which is engaged by an up-shifting operation at timing t5 in FIG. 4.
Figure 6C:
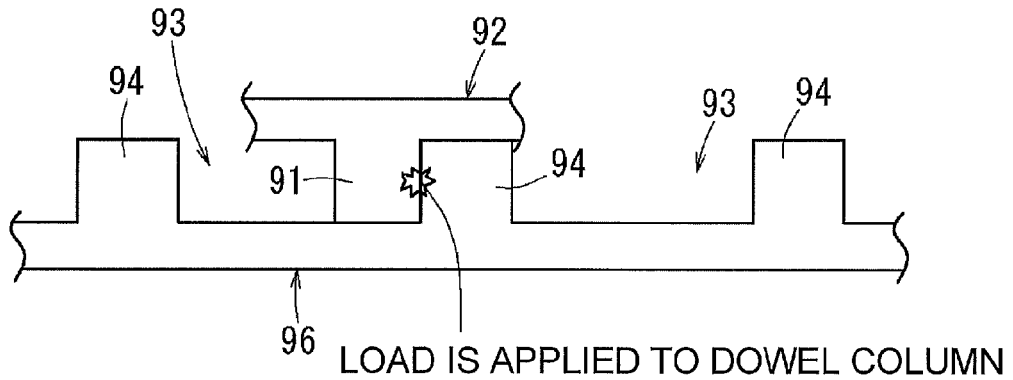
FIG. 6C shows the state of the dog clutch for the next-stage transmission gear which is engaged by an up-shifting operation at timing t6 in FIG. 4.

FIGS. 5A to 6C each show an example of the state of the dog clutch 90 engaged by an up-shifting operation when the clutch lever is not operated according to this embodiment. More specifically, FIG. 5A shows the state of the dog clutch 90 for the next-stage transmission gear G which is engaged by an up-shifting operation at timing t1 in FIG. 4; FIG. 5B shows the state of the dog clutch 90 for the next-stage transmission gear G which is engaged by an up-shifting operation at timing t2 in FIG. 4; and FIG. 5C shows the state of the dog clutch 90 for the next-stage transmission gear G which is engaged by an up-shifting operation at timing t3 in FIG. 4. FIG. 6A shows the state of the dog clutch 90 for the next-stage transmission gear G which is engaged by an up-shifting operation at timing t4 in FIG. 4; FIG. 6B shows the state of the dog clutch 90 for the next-stage transmission gear G which is engaged by an up-shifting operation at timing t5 in FIG. 4; and FIG. 6C shows the state of the dog clutch 90 for the next-stage transmission gear G which is engaged by an up-shifting operation at timing t6 in FIG. 4.

It should be noted that in FIGS. 5A to 5C and FIGS. 6A to 6C, to facilitate understanding, the position of the driven side dog 96 is fixed, and the state in which the driving side dog 92 is moving at a speed relative to the driven side dog 96 is shown. Furthermore, in this embodiment, unless otherwise stated, the driving side dog 92 and the driven side dog 96 refer to the driving side dog and driven side dog, respectively, of the dog clutch 90 for the next-stage transmission gear G which is engaged by an up-shifting operation.

When an up-shifting operation is performed, the output control part 150 restricts the output of the engine by cutting off the fuel injection performed by the fuel injection system 142. By this up-shifting operation, the dog clutch 90 for the current transmission gear G is disengaged. Therefore, when the output of the engine is cut off in response to the up-shifting operation, the engine speed Ne is gradually reduced by the friction of the engine. Consequently, the driving side rotational speed Ne1 of the driving side dog 92 is also gradually reduced. On the other hand, because the rear wheel is rotated by inertia, the rotational speed Nec of the countershaft 20 during the up-shifting operation can be considered to be substantially constant. Therefore, the driven side rotational speed Ne2 of the driven side dog 96 can be considered to be substantially constant. Furthermore, when the up-shifting operation is performed, the vehicle is accelerating. Therefore, the driving side rotational speed Ne1 of the driving side dog 92 immediately after the dog clutch 90 is disengaged becomes more than the driven side rotational speed Ne2 of the driven side dog 96.

When an up-shifting operation is operated and the output of the engine is cut off, the dog teeth 91 of the driving side dog 92 of the dog clutch 90 for the next-stage transmission gear G which is engaged by the up-shifting operation move along the axial direction of the main shaft 18 (direction toward the driven side dog 96). At this time, the dog teeth 91 of the driving side dog 92 might interfere with the dowel columns 94 of the driven side dog 96 and fail to fit into the dog holes 93 of the driven side dog 96. In this case, a torque is generated on the countershaft 20. Then the torque is continuously applied to the countershaft 20 by interference of a side surface of each of the dog teeth 91 with a side surface of the corresponding dowel column 94. However, because the driving side rotational speed Ne1 of the driving side dog 92 is gradually reduced, the interference force of the side surface of the dog tooth 91 with the side surface of the dowel column 94 decreases gradually. Consequently, the torque on the countershaft 20 (torque applied to the countershaft 20) is also gradually reduced to zero (0). FIG. 4 shows the case where an up-shifting operation leads to abutment between the dog tooth 91 and the dowel column 94 and the dog tooth 91 fails to fit readily into the dog hole 93.

At the timing t1, with the side surface of a leading end of the dog tooth 91 of the driving side dog 92 interfering with the side surface of the dowel column 94 of the driven side dog 96, the driving side dog 92 and the driven side dog 96 are rotated together. Therefore, at the timing t1, a load is applied to the dowel column 94, and a torque is applied to the countershaft 20. Also, at this time, the driving side rotational speed Ne1 of the driving side dog 92 becomes the same as the driven side rotational speed Ne2 of the driven side dog 96, and the relative rotational speed between the driving side dog 92 and the driven side dog 96 becomes "0". FIG. 5A shows the state where, with the side surface of the dog tooth 91 of the driving side dog 92 abutting on the side surface of the dowel column 94 of the driven side dog 96, the driving side dog 92 and the driven side dog 96 are moved at a constant rotational speed.

Thereafter, when the driving side rotational speed Ne1 of the driving side dog 92 becomes less than the driven side rotational speed Ne2 of the driven side dog 96 due to the friction of the engine, the rotational speed of the dog tooth 91 of the driving side dog 92 becomes lower than that of the dowel column 94 of the driven side dog 96. As a result, the dog tooth 91 moves in a direction (rearward) away from the dowel column 94. Therefore, the interference force of the side surface of the dog tooth 91 of the driving side dog 92 with the side surface of the dowel column 94 of the driven side dog 96 becomes "0", so that the torque on the countershaft 20 becomes "0". The timing t2 shows the timing when the interference force of the side surface of the dog tooth 91 with the side surface of the dowel column 94 becomes "0". FIG. 5B shows the state where the load between the dog tooth 91 of the driving side dog 92 and the dowel column 94 of the driven side dog 96 becomes "0" at the timing t2. When the torque on the countershaft 20 becomes "0", the dog tooth 91 can be inserted into the dog hole 93.

Here, the reason why the torque on the countershaft 20 does not readily become "0" even if the driving side rotational speed Ne1 becomes less than the driven side rotational speed Ne2 will be briefly described. Because the driving side rotational speed Ne1 is calculated on the basis of the engine speed Ne and the driven side rotational speed Ne2 is calculated on the basis of the rotational speed Nec of the countershaft 20, elements of elastic deformation between the dog tooth 91 and the dowel column 94 are not incorporated. Therefore, the time (t1 and t2) for recovery of the elastic deformation between the dog tooth 91 and the dowel column 94 is needed to make the torque on the countershaft 20 "0" after the driving side rotational speed Ne1 becomes less than the driven side rotational speed Ne2.

Furthermore, the dog tooth 91 is moved further in the direction away from the dowel column 94 to separate from the dowel column 94, and then inserted into the dog hole 93 by an up-shifting operation. Thereafter, the driving side rotational speed Ne1 of the driving side dog 92 is gradually increased by releasing the output restriction of the engine.

Timing t3 shows the timing when, with the leading end as a portion of the dog tooth 91 of the driving side dog 92 inserted into the dog hole 93 of the driven side dog 96, the increase in the driving side rotational speed Ne1 of the driving side dog 92 is started by releasing the output restriction of the engine. FIG. 5C shows the state where, at the timing t3, the dog tooth 91 of the driving side dog 92 is moved away from the dowel column 94 of the driven side dog 96 and the leading end thereof is inserted into the dog hole 93 of the driven side dog 96.

Timing t4 shows the timing when the rotational speed of the driving side dog 92 becomes equal to that of the driven side dog 96 due to the increase in the driving side rotational speed Ne1 of the driving side dog 92 caused by releasing the output restriction of the engine. When the rotational speed of the driving side dog 92 becomes equal to that of the driven side dog 96, the relative speed between the driving side dog 92 and the driven side dog 96 becomes "0", so that the movement of the dog tooth 91 in the direction away from the dowel column 94 is stopped. Also at this time, as shown in FIG. 6A, the dog tooth 91 of the driving side dog 92 is further inserted into the dog hole 93 of the driven side dog 96 by an up-shifting operation.

Timing t5 shows the timing when the dog tooth 91 of the driving side dog 92 is inserted completely into the depth of the dog hole 93 of the driven side dog 96, and FIG. 6B shows the states of the driving side dog 92 and the driven side dog 96 at that time. Because the driving side rotational speed Net of the driving side dog 92 is further increased by releasing the output restriction of the engine, the dog tooth 91 of the driving side dog 92 is moved in the direction toward the dowel column 94 of the driven side dog 96. When the dog tooth 91 is inserted completely into the depth of the dog hole 93, the gear position sensor 126 judges that switching (shifting) to the next-stage transmission gear G is completed. That is, the next-stage transmission gear G is detected by the gear position sensor 126.

Then at timing t6, the dog tooth 91 of the driving side dog 92 abuts on the dowel column 94 of the driven side dog 96. FIG. 6C shows the state where the side surface of the dog tooth 91 of the driving side dog 92 abuts on the side surface of the dowel column 94 of the driven side dog 96. When the dog tooth 91 of the driving side dog 92 abuts on the dowel column 94 of the driven side dog 96, a load is applied to the dowel column 94, and a torque on the countershaft 20 is generated by the integral rotation of the driving side dog 92 and the driven side dog 96. Thus, the driving power of the engine is transmitted to the countershaft 20 to accelerate the rear wheel.

In this manner, in this embodiment, the engine speed Ne is increased by releasing the output restriction of the engine before the completion of shifting to the transmission gear G, thereby allowing shortening of the time to perform the output restriction of the engine and improving the acceleration performance.

Here, because switching between the transmission gears G is completed by inserting the dog tooth 91 completely into the dog hole 93 when the torque on the countershaft 20 is "0", it is preferable to advance the timing when the driving side rotational speed Ne1 increases, while ensuring the time for making the torque on the countershaft 20 "0" which is required for switching between the transmission gears G. On the other hand, there is a time lag from the time that the output control part 150 releases the output restriction of the engine until the driving side rotational speed Ne1 actually starts to increase. In light of such time lag, therefore, it is necessary to advance the timing for releasing the output restriction of the engine. Therefore, the acceleration performance is improved by quickly increasing the driving side rotational speed Ne1 while ensuring the time for making the torque on the countershaft 20 "0" which is required for switching between the transmission gears G.

If the driving side rotational speed Ne1 when performing (immediately before) an up-shifting operation is more than a predetermined value Neth, the time interval between the fuel injection timing and the ignition timing is relatively short. On the other hand, if the driving side rotational speed Ne1 when performing an up-shifting operation is equal to or less than the predetermined value Neth, the time interval between the fuel injection timing and the ignition timing is relatively long. Therefore, the calculation direction of the timing (output recovery timing) for releasing the output restriction of the engine is switched on the basis of whether or not the driving side rotational speed Ne1 when performing an up-shifting operation is equal to or less than the predetermined value Neth.

That is, if the driving side rotational speed Ne1 when performing an up-shifting operation is more than the predetermined value Neth, the timing for releasing the output restriction of the engine is delayed in order to ensure the time for making the torque on the countershaft 20 "0" because the time until the driving side rotational speed Ne1 of the driving side dog 92 increases after the output restriction of the engine is released is relatively short. On the other hand, if the driving side rotational speed Ne1 when performing an up-shifting operation is equal to or less than the predetermined value Neth, the timing for releasing the output restriction of the engine is advanced to the extent possible while ensuring the time for making the torque on the countershaft 20 "0" because the time until the driving side rotational speed Ne1 increases after the output restriction of the engine is released is relatively long.

The predetermined value Neth is stored in the predetermined value memory part 152 and provided for each transmission gear (G1 to G5) when performing an up-shifting operation. That is, the predetermined values Neth are provided corresponding to the first to fifth transmission gears G1 to G5. Therefore, the predetermined value Neth varies depending on the transmission gear G when performing an up-shifting operation. It should be noted that because in this embodiment, the sixth speed is the highest shift position of the transmission gear G, the predetermined value Neth corresponding to the sixth speed is not provided. This is because no further up-shifting operation is performed if the sixth transmission gear G6 is connected. These predetermined values Neth are values preliminarily determined by experiments, calculation or the like.

Figure 7:
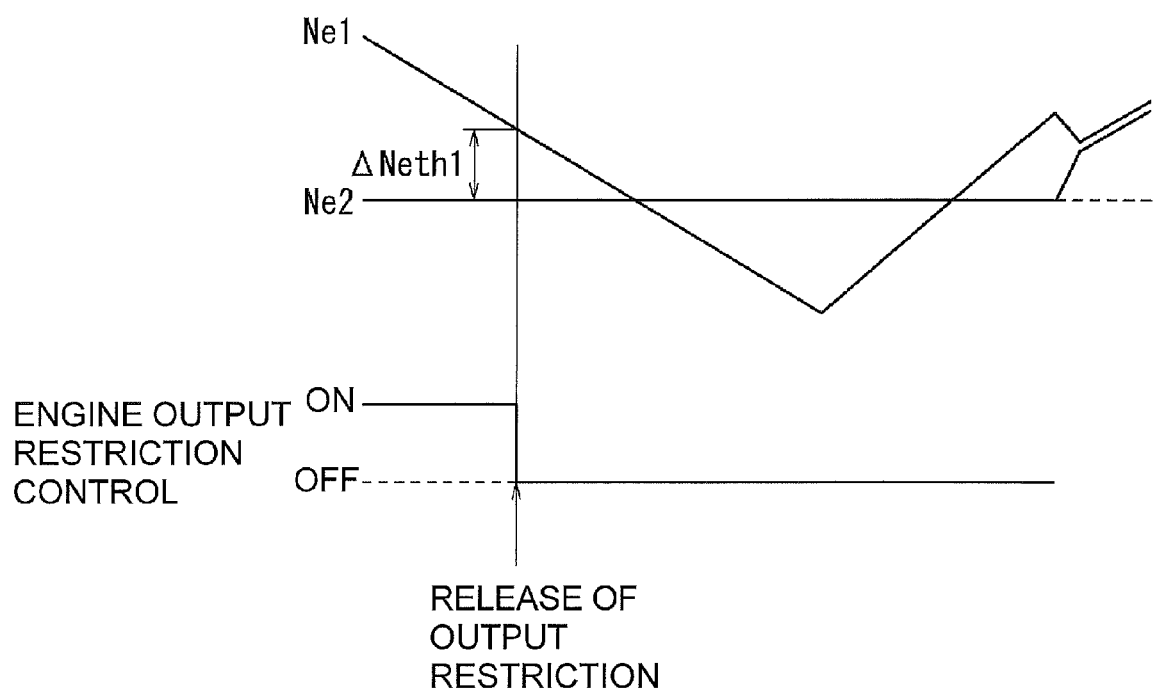
FIG. 7 is a view for explaining the timing for releasing the output restriction of an engine when the driving side rotational speed of the driving side dog when performing an up-shifting operation is equal to or less than a predetermined value.

FIG. 7 is a view for explaining the timing for releasing the output restriction of the engine when the driving side rotational speed Ne1 when performing an up-shifting operation is equal to or less than the predetermined value Neth. If the driving side rotational speed Ne1 when performing an up-shifting operation is equal to or less than the predetermined value Neth, the output control part 150 releases the output restriction at the timing when a difference ΔNe between the driving side rotational speed Ne1 and the driven side rotational speed Ne2 becomes equal to or less than a first predetermined rotational speed ΔNeth1. The difference ΔNe between the driving side rotational speed Ne1 and the driven side rotational speed Ne2 is a value obtained by subtracting the driven side rotational speed Ne2 from the driving side rotational speed Ne1. It should be noted that, because the driven side rotational speed Ne2 can be considered to be substantially constant during the up-shifting operation, the driven side rotational speed Ne2 in FIG. 7 represents the driven side rotational speed Ne2 during the up-shifting operation.

Figure 8:
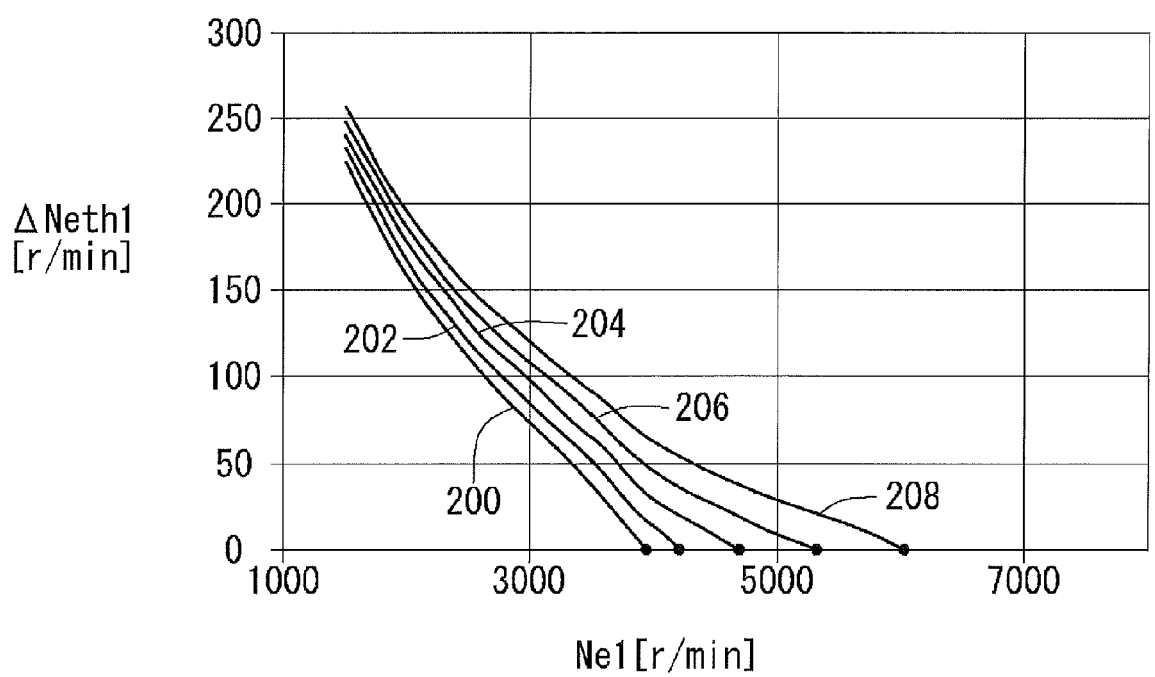
FIG. 8 shows a first predetermined rotational speed stored in a first map of FIG. 1.

The first predetermined rotational speed ΔNeth1 is stored in the first map 160. FIG. 8 shows the first predetermined rotational speed ΔNeth1 stored in the first map 160. As shown in FIG. 8, the first map 160 stores the first predetermined rotational speed ΔNeth1 corresponding to the driving side rotational speed Ne1 when performing an up-shifting operation. The first predetermined rotational speed ΔNeth1 increases in value as the driving side rotational speed Net decreases. Consequently, the lower the driving side rotational speed Ne1, the earlier the timing for releasing the output restriction. Furthermore, the first predetermined rotational speed ΔNeth1 is stored for each transmission gear (G1 to G5) when performing an up-shifting operation. Therefore, the first predetermined rotational speed ΔNeth1 varies in value depending on the transmission gear G and the driving side rotational speed Ne1 when performing an up-shifting operation.

In the first map 160, a line 200 shows the first predetermined rotational speed ΔNeth1 corresponding to the driving side rotational speed Ne1 when the transmission gear G when performing an up-shifting operation is the first transmission gear G1. A line 202 shows the first predetermined rotational speed ΔNeth1 corresponding to the driving side rotational speed Ne1 when the transmission gear G when performing an up-shifting operation is the second transmission gear G2. In the same manner, lines 204, 206, and 208 show the first predetermined rotational speeds ΔNeth1 corresponding to the driving side rotational speeds Ne1 when the transmission gears G when performing an up-shifting operations are the third to fifth transmission gears G3 to G5. These first predetermined rotational speeds ΔNeth1 are values preliminarily determined by experiments, calculation or the like. It should be noted that because in this embodiment, the sixth speed is the highest shift position of the transmission gear G, the first predetermined rotational speeds ΔNeth1 corresponding to the sixth transmission gear G6 is not provided.

It should be noted that in the first map 160 of FIG. 8, the driving side rotational speed Ne1 (indicated by a black dot) when the first predetermined rotational speed ΔNeth1 of each of the lines 200, 202, 204, 206, and 208 becomes 0 [r/min] is the same value as the predetermined value Neth provided for each transmission gear (G1 to G5).

Figure 9:
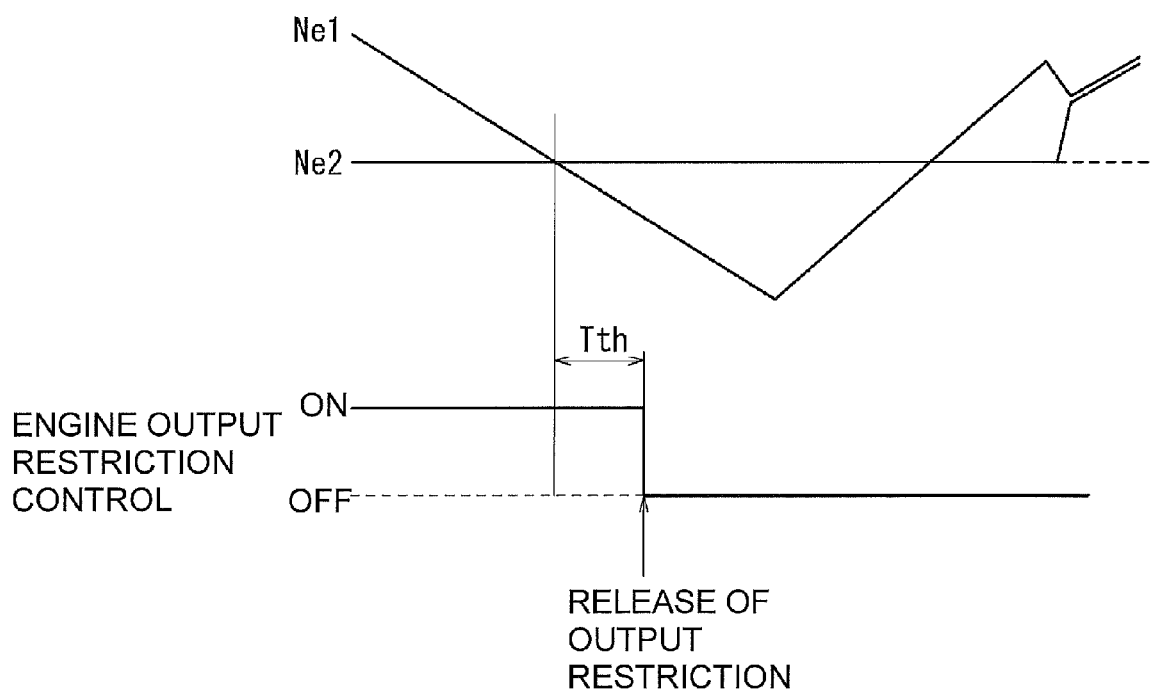
FIG. 9 is a view for explaining the timing for releasing the output restriction of the engine when the driving side rotational speed of the driving side dog when performing an up-shifting operation is more than the predetermined value.

FIG. 9 is a view for explaining the timing for releasing the output restriction of the engine when the driving side rotational speed Ne1 when performing an up-shifting operation is more than the predetermined value Neth. If the driving side rotational speed Ne1 when performing an up-shifting operation is more than the predetermined value Neth, the output control part 150 releases the output restriction at the timing when a predetermined time Tth passes after the driving side rotational speed Ne1 decreases to the driven side rotational speed Ne2. It should be noted that, because the driven side rotational speed Ne2 can be considered to be substantially constant during the up-shifting operation, the driven side rotational speed Ne2 in FIG. 9 represents the driven side rotational speed Ne2 during the up-shifting operation.

Figure 10:
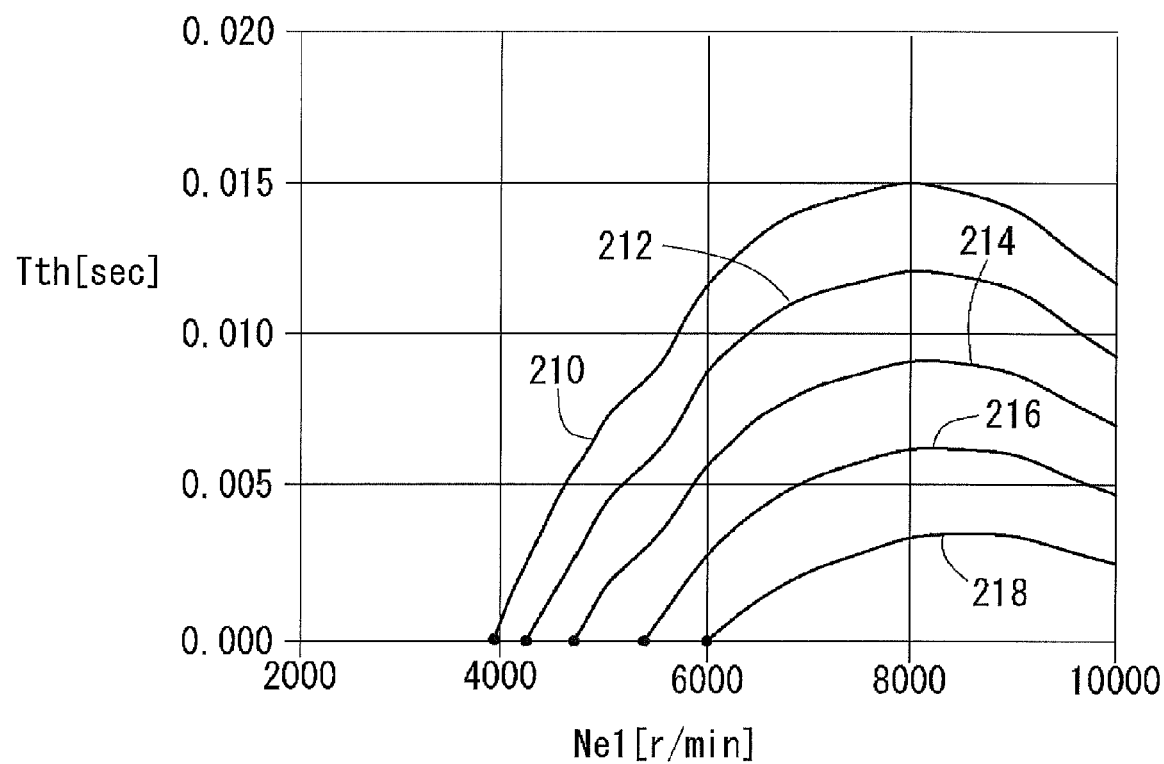
FIG. 10 shows a predetermined time stored in a second map of FIG. 1.

The predetermined time Tth is stored in the second map 162. FIG. 10 shows the predetermined time Tth stored in the second map 162. As shown in FIG. 10, the second map 162 stores the predetermined time Tth corresponding to the driving side rotational speed Ne1 when performing an up-shifting operation. Until the driving side rotational speed Ne1 exceeds about 8000 [r/min], the predetermined time Tth increases in value as the driving side rotational speed Ne1 increases. Therefore, until the driving side rotational speed Ne1 exceeds about 8000 [r/min], the higher the driving side rotational speed Ne1, the later the timing for releasing the output restriction. Furthermore, the predetermined time Tth is stored for each transmission gear (G1 to G5) when performing an up-shifting operation. Therefore, the predetermined time Tth varies in value depending on the transmission gear G and the driving side rotational speed Ne1 when performing an up-shifting operation.

In the second map 162, a line 210 shows the predetermined time Tth corresponding to the driving side rotational speed Ne1 when the transmission gear G when performing an up-shifting operation is the first transmission gear G1. A line 212 shows the predetermined time Tth corresponding to the driving side rotational speed Ne1 when the transmission gear G when performing an up-shifting operation is the second transmission gear G2. In the same manner, lines 214, 216, and 218 show the predetermined times Tth corresponding to the driving side rotational speeds Ne1 when the transmission gears G when performing up-shifting operations are the third to fifth transmission gears G3 to G5. These predetermined times Tth are values preliminarily determined by experiments, calculation or the like. It should be noted that because in this embodiment, the sixth speed is the highest shift position of the transmission gear G, the predetermined time Tth corresponding to the sixth transmission gear G6 is not provided.

It should be noted that in the second map 162 of FIG. 10, the driving side rotational speed Ne1 (indicated by a black dot) when the predetermined time Tth of each of the lines 210, 212, 214, 216, and 218 becomes 0.000 [sec] is the same value as the predetermined value Neth provided for each transmission gear (G1 to G5).

Figure 11:
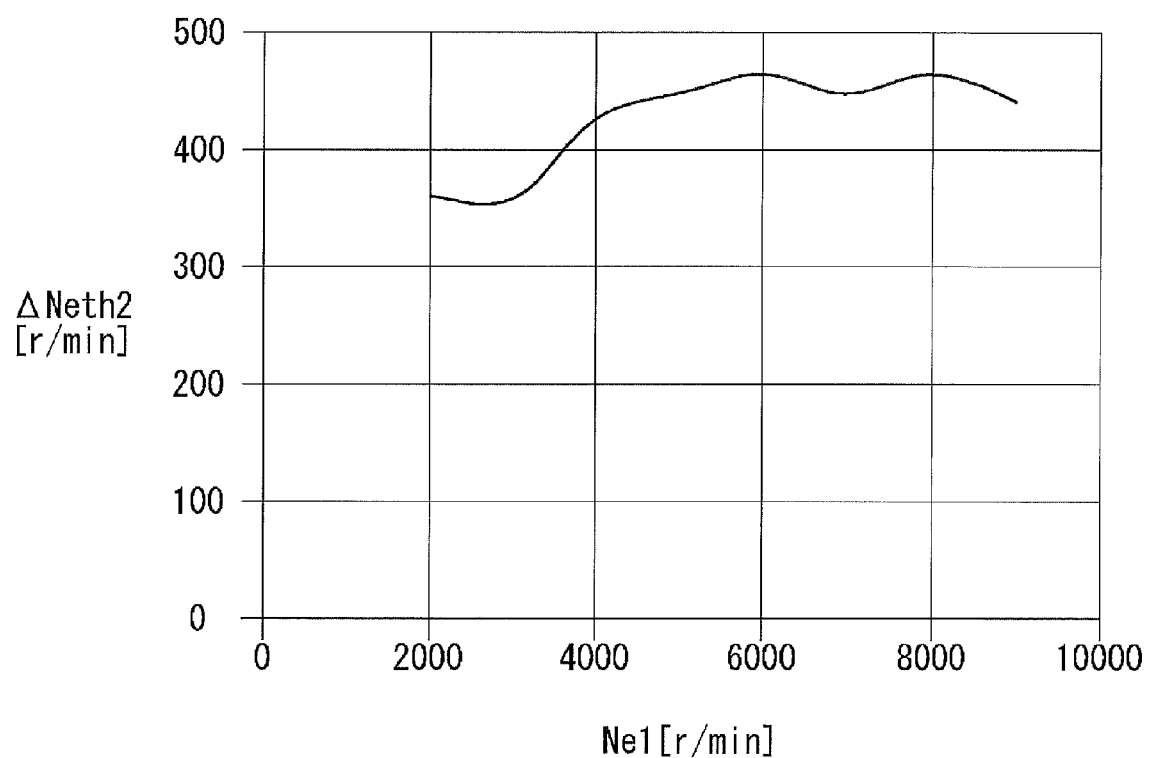
FIG. 11 shows a second predetermined rotational speed stored in a third map of FIG. 1.
Figure 12:
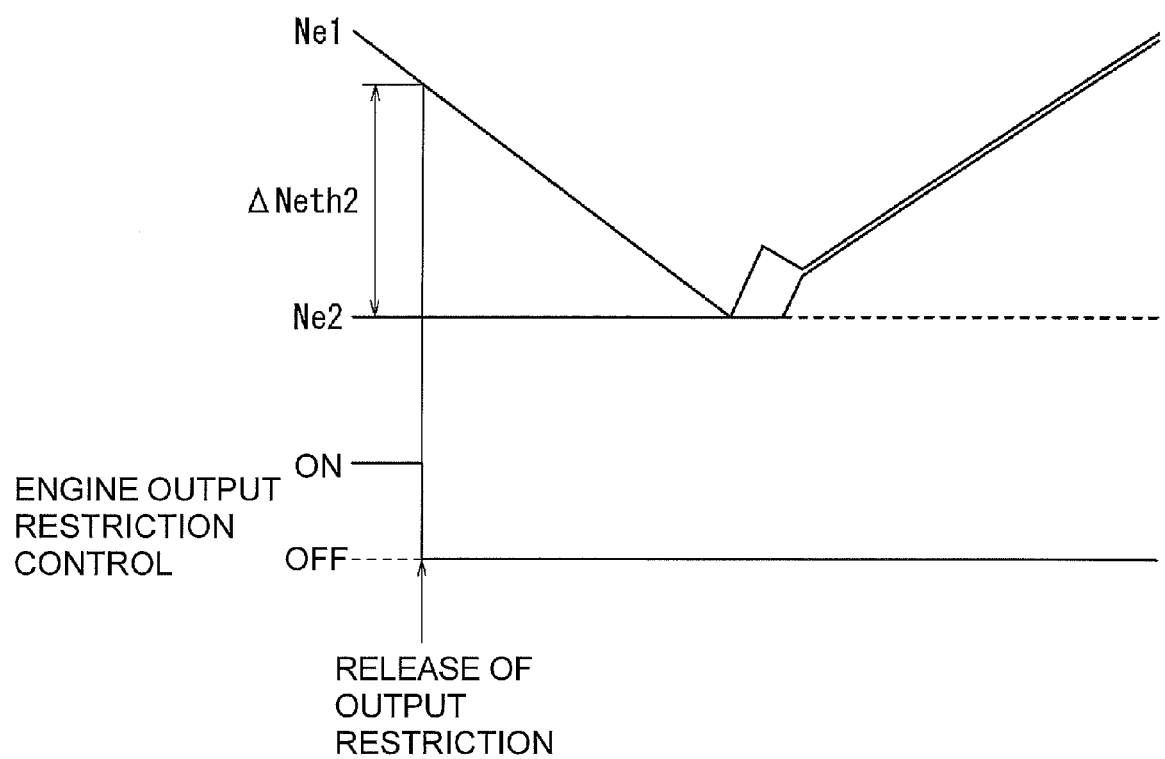
FIG. 12 is a view for explaining the timing for releasing the output restriction of the engine when switching between transmission gears is completed without interference between dog teeth of the driving side dog and dowel columns of the driven side dog.

As shown in FIG. 11, the third map 164 stores a second predetermined rotational speed ΔNeth2 corresponding to the driving side rotational speed Ne1 when performing an up-shifting operation. The second predetermined rotational speed ΔNeth2 is used when switching to the next-stage transmission gear G is completed without interference between the dog tooth 91 of the driving side dog 92 and the dowel column 94 of the driven side dog 96 of the dog clutch 90 for the next-stage transmission gear G. At this time, as shown in FIG. 12, the output control part 150 releases the output restriction at the timing when the difference ΔNe between the driving side rotational speed Ne1 of the driving side dog 92 and the driven side rotational speed Ne2 of the driven side dog 96 of the dog clutch 90 for the next-stage transmission gear G switched by an up-shifting operation becomes equal to or less than the second predetermined rotational speed ΔNeth2. It should be noted that, because the driven side rotational speed Ne2 can be considered to be substantially constant during the up-shifting operation, the driven side rotational speed Ne2 in FIG. 12 represents the driven side rotational speed Ne2 when performing the up-shifting operation.

Figure 13:
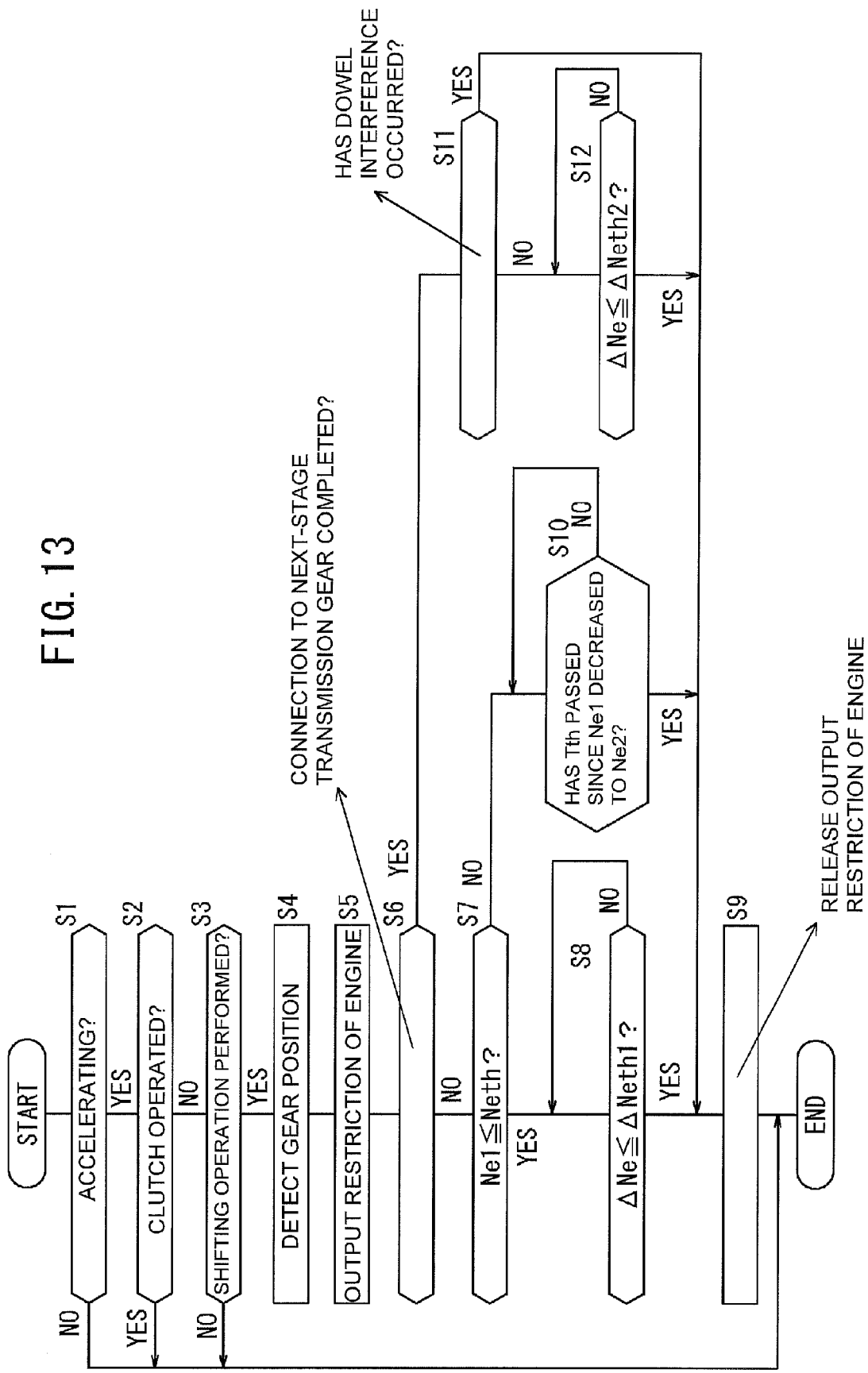
FIG. 13 is a flowchart showing the operation of an ECU of the shift control system of FIG. 1.

Next, operation of the shift control system 10 will be described with reference to the flowchart of FIG. 13. Firstly, the output control part 150 judges whether or not the motorcycle equipped with the shift control system 10 is accelerating (step S1). This judgment may be made on the basis of the throttle opening detected by the throttle opening sensor 132, the engine speed Ne detected by the engine speed sensor 136, or the rotational speed Nec of the countershaft 20 detected by the countershaft speed sensor 138.

If judging in the step S1 that the motorcycle is accelerating, the output control part 150 judges whether or not the clutch lever is operated, that is, whether or not the main clutch 22 is disengaged (step S2). This judgment is made on the basis of the detection signal detected by the clutch detecting sensor 134.

If judging in the step S2 that the clutch lever is not operated, the output control part 150 judges whether or not the shift pedal is operated (step S3). This judgment is made on the basis of the detection signal detected by the spindle rotational angle sensor 108.

If judging in the step S3 that the shift pedal is operated, the output control part 150 judges that an up-shifting operation is performed when the clutch lever is not operated, and the gear position sensor 126 detects the gear position when performing (before) the up-shifting operation (step S4).

Then the output control part 150 performs output restriction to restrict the output of the engine (step S5). In this operation, the engine output restriction is performed by inhibiting the fuel injection performed by the fuel injection system 142.

Then the output control part 150 judges whether or not switching to the next-stage transmission gear G is completed by the up-shifting operation (step S6). If the next-stage transmission gear (gear position) G is detected by the gear position sensor 126, the output control part 150 judges that switching to the next-stage transmission gear G is completed. If switching between the transmission gears G is quickly performed without interference between the dog tooth 91 of the driving side dog 92 and the dowel column 94 of the driven side dog 96 of the dog clutch 90 for the next-stage transmission gear G, it is judged in step S6 that switching to the next-stage transmission gear G is completed. On the other hand, if the dog tooth 91 of the driving side dog 92 interferes with the dowel column 94 of the driven side dog 96 of the dog clutch 90 for the next-stage transmission gear G, and the dog tooth 91 is not readily inserted into the dog hole 93, it is judged in the step S6 that switching to the next-stage transmission gear G is not completed.

If judging in the step S6 that switching to the next-stage transmission gear G is not completed, the output control part 150 reads, from the predetermined value memory part 152, the predetermined value Neth corresponding to the transmission gear (gear position) G when performing the up-shifting operation detected in the step S4 and judges whether or not the driving side rotational speed Ne1 detected when performing the up-shifting operation is equal to or less than the read predetermined value Neth (step S7). It should be noted that because the dog clutch 90 for the current transmission gear G is engaged when performing the up-shifting operation, the driving side rotational speed Ne1 and the driven side rotational speed Ne2 become the same values. Therefore, in the step S7, it may be judged whether or not the driven side rotational speed Ne2 is equal to or less than the predetermined value Neth.

If judging in the step S7 that the driving side rotational speed Ne1 detected when performing the up-shifting operation is equal to or less than the predetermined value Neth, the output control part 150 proceeds to step S8. In the step S8, the output control part 150 reads, from the first map 160, the first predetermined rotational speed ΔNeth1 corresponding to the transmission gear G when performing the up-shifting operation detected in the step S4 and the driving side rotational speed Ne1 detected when performing the up-shifting operation. Then the output control part 150 judges whether or not the difference ΔNe between the current driving side rotational speed Ne1 and driven side rotational speed Ne2 is equal to or less than the read first predetermined rotational speed ΔNeth1.

If judging in the step 8 that the difference ΔNe is not equal to or less than the first predetermined rotational speed ΔNeth1, the output control part 150 remains in the step S8 until the difference ΔNe becomes equal to or less than the first predetermined rotational speed ΔNeth1. On the other hand, if judging in the step 8 that the difference ΔNe is equal to or less than the first predetermined rotational speed ΔNeth1, the output control part 150 proceeds to step S9 to release the output restriction of the engine. In this operation, because the engine output restriction is performed by inhibiting the fuel injection performed by the fuel injection system 142, the output restriction of the engine is released by restarting the fuel injection. In this manner, if the driving side rotational speed Ne1 is equal to or less than the predetermined value Neth, the output restriction of the engine is released before the driving side rotational speed Net decreases to the driven side rotational speed Ne2. Thus, it is possible to quickly increase the engine speed Ne while ensuring the time for making the torque on the countershaft 20 "0" which is required for switching between the transmission gears G. Consequently, the acceleration performance can be improved.

If judging in the step S7 that the driving side rotational speed Ne1 detected when performing the up-shifting operation is not equal to or less than the predetermined value Neth, the output control part 150 proceeds to step S10. In the step S10, the output control part 150 reads, from the second map 162, the predetermined time Tth corresponding to the transmission gear G when performing the up-shifting operation detected in the step S4 and the driving side rotational speed Net detected when performing the up-shifting operation. Then the output control part 150 judges whether or not the predetermined time Tth passes after the current driving side rotational speed Ne1 decreases to the driven side rotational speed Ne2 (step S10).

In the step S10, if the driving side rotational speed Net does not decrease to the driven side rotational speed Ne2, or if, while the driving side rotational speed Ne1 decreases to the driven side rotational speed Ne2, the predetermined time Tth does not pass after the driving side rotational speed Ne1 decreases to the driven side rotational speed Ne2, the output control part 150 remains in the step S10. On the other hand, if in the step S10, the predetermined time Tth passes after the driving side rotational speed Ne1 decreases to the driven side rotational speed Ne2, the output control part 150 proceeds to the step S9 to release the output restriction of the engine. Thus, it is possible to quickly increase the engine speed Ne while ensuring the time for making the torque on the countershaft 20 "0" which is required for switching between the transmission gears G. Consequently, the acceleration performance can be improved.

If judging in the step S6 that switching to the next-stage transmission gear G is completed, the output control part 150 judges whether or not dowel interference occurs, that is, whether or not the dog tooth 91 of the driving side dog 92 interferes with the dowel column 94 of the driven side dog 96 (step S11). That is, the output control part 150 judges whether or not the dog tooth 91 is inserted completely into the depth of the dog hole 93 and interferes with the dowel column 94. If the deceleration of the driving side dog 92 exceeds a predetermined value, the output control part 150 judges that the dog tooth 91 interferes with the dowel column 94.

If judging in the step S11 that the dog tooth 91 does not interfere with the dowel column 94, the output control part 150 proceeds to step S12. In the step S12, the output control part 150 reads, from the third map 164, the second predetermined rotational speed ΔNeth2 corresponding to the driving side rotational speed Ne1 detected when performing the up-shifting operation. Then the output control part 150 judges whether or not the difference ΔNe between the current driving side rotational speed Ne1 of the driving side dog 92 and the driven side rotational speed Ne2 of the driven side dog 96 of the dog clutch 90 engaged by the up-shifting operation is equal to or less than the second predetermined rotational speed ΔNeth2 (step S12).

If judging in the step S12 that the difference ΔNe is not equal to or less than the second predetermined rotational speed ΔNeth2, the output control part 150 remains in the step S12 until the difference ΔNe becomes equal to or less than the second predetermined rotational speed ΔNeth2. On the other hand, if judging in the step S12 that the difference ΔNe is equal to or less than the second predetermined rotational speed ΔNeth2, the output control part 150 proceeds to the step S9 to release the output restriction of the engine.

Here, the reason why the output restriction is not released until the difference ΔNe becomes equal to or less than the second predetermined rotational speed ΔNeth2 will be described. In the case where the difference ΔNe is more than the second predetermined rotational speed ΔNeth2, when the driving side rotational speed Ne1 of the driving side dog 92 is increased by the release of the output restriction, and the dog tooth 91 of the driving side dog 92 interferes with the dowel column 94 of the driven side dog 96, the interference force of the dog tooth 91 with the dowel column 94 is excessively large. Therefore, in response thereto, the torque on the countershaft 20 also varies widely. Consequently, in this embodiment, in order to alleviate the interference force of the dog tooth 91 with the dowel column 94 and reduce torque variations on the countershaft 20, the output restriction is released when the difference ΔNe becomes equal to or less than the second predetermined rotational speed ΔNeth2.

Figure 14:
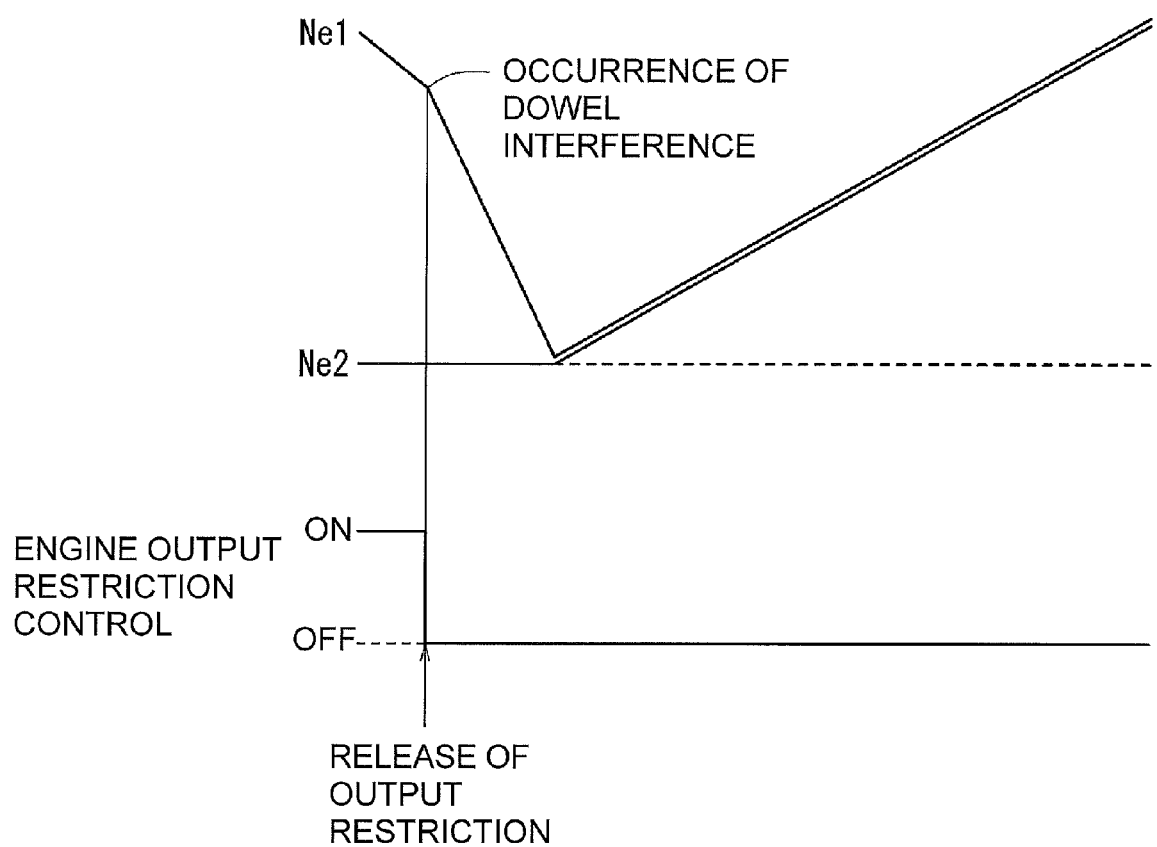
FIG. 14 is a view for explaining the timing for releasing the output restriction of the engine when switching between transmission gears is completed and dowel interference occurs.

If judging in the step S11 that dowel interference occurs, as shown in FIG. 14, the output control part 150 proceeds to the step S9 to immediately release the output restriction of the engine. As shown in FIG. 14, the driving side rotational speed Ne1 decreases sharply due to the occurrence of dowel interference. It should be noted that also in FIG. 14, the driven side rotational speed Ne2 represents the driven side rotational speed Ne2 when performing the up-shifting operation.

In this manner, in this embodiment, the output restriction of the engine is released before the completion of switching to the next-stage transmission gear G by the up-shifting operation, thereby allowing shortening of the time to perform the output restriction of the engine and improving the acceleration performance.

Furthermore, the higher the engine speed Ne, the shorter the time until the driving side rotational speed Ne1 actually increases after the output restriction is released. Therefore, the method for calculating the timing for releasing the output restriction of the engine is switched according to whether or not the driving side rotational speed Ne1 or the driven side rotational speed Ne2 when performing the up-shifting operation is equal to or less than the predetermined value Neth, thereby allowing the release of the output restriction of the engine at a proper timing while shortening the time for restricting the output of the engine.

The predetermined value Neth, the first predetermined rotational speed ΔNeth1, the predetermined time Tth, and the second predetermined rotational speed ΔNeth2 are set in accordance with the transmission gear G when performing an up-shifting operation, thereby allowing the optimization of the time to perform the output restriction of the engine and the release of the output restriction at a more proper timing.

If the driving side rotational speed Ne1 or the driven side rotational speed Ne2 when performing an up-shifting operation is equal to or less than the predetermined value Neth, the time until the driving side rotational speed Net actually increases after the output restriction of the engine is released is long. Therefore, by advancing the release of the engine output restriction, it is possible to improve the acceleration performance while ensuring the time for making the torque on the countershaft 20 "0" which is required for switching between the transmission gears G.

If the driving side rotational speed Ne1 or the driven side rotational speed Ne2 when performing an up-shifting operation is more than the predetermined value Neth, the time until the driving side rotational speed Ne1 actually increases after the output restriction of the engine is released is short. Therefore, by delaying the release of the output restriction of the engine, it is possible to improve the acceleration performance while ensuring the time for making the torque on the countershaft 20 "0" which is required for switching between the transmission gears G.

It should be noted that although in the above-described embodiment, the rotational speed Ne1 of the driving side dog 92 is explained as the driving side rotational speed, the rotational speed of the main shaft 18 or the engine speed Ne may be set as the driving side rotational speed because the rotational speed Ne1 of the driving side dog 92 and the rotational speed of the main shaft 18 are proportional to the engine speed Ne. Furthermore, although the rotational speed Ne2 of the driven side dog 96 is explained as the driven side rotational speed, the rotational speed of the rear wheel or the rotational speed Nec of the countershaft 20 may be set as the driven side rotational speed because the rotational speed Ne2 of the driven side dog 96 and the rotational speed of the rear wheel are proportional to the rotational speed Nec of the countershaft 20.

Moreover, although it is judged in the step S7 whether or not the driving side rotational speed Ne1 when performing an up-shifting operation is equal to or less than the predetermined value Neth, the driving side rotational speed Net and the driven side rotational speed Ne2 are in a proportional relation because the dog clutch 90 for the current transmission gear G is in an engaged state when performing the up-shifting operation. Therefore, it may be judged in the step S7 whether or not the driven side rotational speed Ne2 when performing an up-shifting operation is equal to or less than the predetermined value Neth.

While an embodiment of the present invention has been described above, the technical scope of the invention is not limited to the scope of the above-described embodiment. It should be apparent to those skilled in the art that various changes or improvements can be made to the above-described embodiment. It will be apparent from the description of the appended claims that implementations including such changes or improvements are encompassed in the technical scope of the invention.

A shift control system (10) according to the embodiment of the present invention has the following features.

First feature: The shift control system (10) includes: engine speed detecting means (136) that detects an engine speed; a multistage transmission (12) that switches engagement conditions of a dog clutch (90) by displacing shift forks (114, 116, 118) driven in an axial direction of a shift drum (100) along with turning of the shift drum (100) by an operation of a shift operating element, the dog clutch (90) being constituted by a meshing engagement between a driving side dog (92) and a driven side dog (96) of transmission gears respectively mounted to a main shaft (18) and a countershaft (20); gear position detecting means (126) that detects a transmission gear; shifting operation detecting means (108) that detects an operation of the shift operating element; and an output control part (150) that restricts output of an engine when an up-shifting operation is detected by the shifting operation detecting means (108). The output control part (150) releases output restriction of the engine before the gear position detecting means (126) detects that switching to a next-stage transmission gear by the up-shifting operation of the shift operating element is completed.

Second feature: The shift control system (10) further includes countershaft speed detecting means (138) that detects a rotational speed of the countershaft (20). The output control part (150) switches a method for calculating timing for releasing the output restriction of the engine according to whether or not a driving side rotational speed or a driven side rotational speed is equal to or less than a predetermined value. The driving side rotational speed corresponds to the engine speed or a rotational speed of the main shaft (18). The driven side rotational speed corresponds to a rotational speed of a driving wheel or the rotational speed of the countershaft (20).

Third feature: The predetermined value is set in accordance with the transmission gear detected by the gear position detecting means (126) when performing an up-shifting operation of the shift operating element.

Fourth feature: If the driving side rotational speed or the driven side rotational speed is equal to or less than the predetermined value, the output control part (150) releases the output restriction at timing when a difference between the driving side rotational speed and the driven side rotational speed becomes equal to or less than a predetermined rotational speed.

Fifth feature: If the driving side rotational speed or the driven side rotational speed is more than the predetermined value, the output control part (150) releases the output restriction at timing when a predetermined time passes after the driving side rotational speed decreases to the driven side rotational speed.

According to the first feature of the embodiment of the present invention, the output restriction of the engine is released before switching to a next-stage transmission gear by the up-shifting operation is completed, thereby allowing shortening of the time to perform the output restriction of the engine and improving the acceleration performance.

According to the second feature of the embodiment of the present invention, the higher the engine speed, the shorter the time until the engine speed actually increases after the output restriction is released. Therefore, the method for calculating the timing for releasing the output restriction of the engine is switched according to whether or not the driving side rotational speed proportional to the engine speed or the driven side rotational speed is equal to or less than the predetermined value, thereby allowing the release of the output restriction of the engine at a proper timing while shortening the time to perform the output restriction of the engine.

According to the third feature of the embodiment of the present invention, the predetermined value is set in accordance with the transmission gear when performing the up-shifting operation, thereby allowing the optimization of the time to perform the output restriction of the engine and the release of the output restriction of the engine at a more proper timing.

According to the fourth feature of the embodiment of the present invention, if the driving side rotational speed or the driven side rotational speed is equal to or less than the predetermined value, the time until the engine speed actually increases after the output restriction of the engine is released is long. Therefore, by advancing the release of the engine output restriction, it is possible to improve the acceleration performance while ensuring the time for making the torque on the countershaft "0" which is required for switching between the transmission gears.

According to the fifth feature of the embodiment of the present invention, if the driving side rotational speed or the driven side rotational speed is more than the predetermined value, the time until the engine speed actually increases after the output restriction of the engine is released is short. Therefore, by delaying the release of the output restriction of the engine, it is possible to ensure the time for making the torque on the countershaft "0" which is required for switching between the transmission gears.

Obviously, numerous modifications and variations of the present invention are possible in light of the above teachings. It is therefore to be understood that within the scope of the appended claims, the invention may be practiced otherwise than as specifically described herein.

What is claimed is:

1. A shift control system comprising:
engine speed detecting means that detects an engine speed;
multistage transmission that switches engagement conditions of a dog clutch by displacing shift forks driven in an axial direction of a shift drum along with turning of the shift drum by an operation of a shift operating element, the dog clutch being constituted by meshing engagement between a driving side dog and a driven side dog of transmission gears respectively mounted to a main shaft and a countershaft;
gear position detecting means that detects a transmission gear;
shifting operation detecting means that detects an operation of the shift operating element; and
an output control part that restricts output of an engine when an up-shifting operation is detected by the shifting operation detecting means,
wherein the output control part releases output restriction of the engine before the gear position detecting means detects that switching to a next-stage transmission gear by the up-shifting operation of the shift operating element is completed.

2. The shift control system according to claim 1, further comprising:
countershaft speed detecting means that detects a rotational speed of the countershaft,
wherein the output control part switches a method for calculating timing for releasing the output restriction of the engine according to whether or not a driving side rotational speed or a driven side rotational speed is equal to or less than a predetermined value, the driving side rotational speed corresponding to the engine speed or a rotational speed of the main shaft, the driven side rotational speed corresponding to a rotational speed of a driving wheel or the rotational speed of the countershaft.

3. The shift control system according to claim 2, wherein the predetermined value is set in accordance with the transmission gear detected by the gear position detecting means when performing an up-shifting operation of the shift operating element.

4. The shift control system according to claim 2, wherein if the driving side rotational speed or the driven side rotational speed is equal to or less than the predetermined value, the output control part releases the output restriction at timing when a difference between the driving side rotational speed and the driven side rotational speed becomes equal to or less than a predetermined rotational speed.

5. The shift control system according claim 2, wherein if the driving side rotational speed or the driven side rotational speed is more than the predetermined value, the output control part releases the output restriction at timing when a predetermined time passes after the driving side rotational speed decreases to the driven side rotational speed.

6. The shift control system according to claim 1, wherein the output control part restricts output of the engine by inhibiting fuel injection to the engine.

7. The shift control system according to claim 1, wherein the output control part restricts output of the engine by cutting off fuel injection to the engine.

8. The shift control system according to claim 1, wherein the output control part releases output restriction of the engine by restarting fuel injection to the engine.

9. A shift control system comprising:
an engine speed detector configured to detect an engine speed;
a multistage transmission configured to displace shift forks configured to be driven in an axial direction of a shift drum along with turning of the shift drum by an operation of a shift operating element to switch engagement conditions of a dog clutch, the dog clutch being constituted by meshing engagement between a driving side dog and a driven side dog of transmission gears respectively mounted to a main shaft and a countershaft;
a gear position detector configured to detect a transmission gear;
a shifting operation detector configured to detect the operation of the shift operating element; and
an output controller configured to restrict output of an engine in a case where an up-shifting operation is detected by the shifting operation detector, the output controller being configured to release output restriction of the engine before the gear position detector detects that switching to a next-stage transmission gear by the up-shifting operation of the shift operating element is completed.

10. The shift control system according to claim 9, further comprising:
countershaft speed detector configured to detect a rotational speed of the countershaft,
wherein the output controller switches a method for calculating timing for releasing the output restriction of the engine according to whether or not a driving side rotational speed or a driven side rotational speed is equal to or less than a predetermined value, the driving side rotational speed corresponding to the engine speed or a rotational speed of the main shaft, the driven side rotational speed corresponding to a rotational speed of a driving wheel or the rotational speed of the countershaft.

11. The shift control system according to claim 10, wherein
the predetermined value is set in accordance with the transmission gear detected by the gear position detector in a case where the up-shifting operation of the shift operating element is performed.

12. The shift control system according to claim 10, wherein
if the driving side rotational speed or the driven side rotational speed is equal to or less than the predetermined value, the output controller releases the output restriction at timing when a difference between the driving side rotational speed and the driven side rotational speed becomes equal to or less than a predetermined rotational speed.

13. The shift control system according claim 10, wherein
if the driving side rotational speed or the driven side rotational speed is more than the predetermined value, the output controller releases the output restriction at timing when a predetermined time passes after the driving side rotational speed decreases to the driven side rotational speed.

14. The shift control system according to claim 9, wherein the output controller restricts output of the engine by inhibiting fuel injection to the engine.

15. The shift control system according to claim 9, wherein the output controller restricts output of the engine by cutting off fuel injection to the engine.

16. The shift control system according to claim 9, wherein the output controller releases output restriction of the engine by restarting fuel injection to the engine.

17. A shift control system comprising:
engine speed detecting means for detecting an engine speed;
a multistage transmission configured to displace shift forks configured to be driven in an axial direction of a shift drum along with turning of the shift drum by an operation of a shift operating element to switch engagement conditions of a dog clutch, the dog clutch being constituted by meshing engagement between a driving side dog and a driven side dog of transmission gears respectively mounted to a main shaft and a countershaft;
gear position detecting means for detecting a transmission gear;
shifting operation detecting means for detecting the operation of the shift operating element; and
output control means for restricting output of an engine in a case where an up-shifting operation is detected by the shifting operation detecting means, the output control means being configured to release output restriction of the engine before the gear position detecting means detects that switching to a next-stage transmission gear by the up-shifting operation of the shift operating element is completed.

18. The shift control system according to claim 17, wherein the output control means restricts output of the engine by inhibiting fuel injection to the engine.

19. The shift control system according to claim 17, wherein the output control means restricts output of the engine by cutting off fuel injection to the engine.

20. The shift control system according to claim 17, wherein the output control means releases output restriction of the engine by restarting fuel injection to the engine.

* * * * *